(12) United States Patent
Reiser

(10) Patent No.: US 6,889,597 B2
(45) Date of Patent: May 10, 2005

(54) ADJUSTING ELEMENT HAVING A CYLINDER

(75) Inventor: Alexander Reiser, Koblenz (DE)

(73) Assignee: Stabilus GmbH, Koblenz (DE)

( * ) Notice: Subject to any disclaimer, the term of this patent is extended or adjusted under 35 U.S.C. 154(b) by 30 days.

(21) Appl. No.: 10/346,760

(22) Filed: Jan. 17, 2003

(65) Prior Publication Data

US 2004/0079225 A1 Apr. 29, 2004

(30) Foreign Application Priority Data

Jan. 22, 2002 (DE) .......................................... 102 02 415
Dec. 19, 2002 (DE) .......................................... 102 59 417

(51) Int. Cl.$^7$ ................................................ F16J 15/18
(52) U.S. Cl. ...................... 92/168; 277/917; 267/64.28
(58) Field of Search ........................... 92/168; 277/917; 267/64.28

(56) References Cited

U.S. PATENT DOCUMENTS

| | | | |
|---|---|---|---|
| 3,995,842 A | 12/1976 | Freitag | ...................... 267/64 R |
| 4,779,845 A | 10/1988 | Bartesch et al. | |
| 5,485,987 A | 1/1996 | Jobelius et al. | ........... 267/64.28 |
| 5,862,893 A | 1/1999 | Volpel | ......................... 188/276 |
| 6,086,059 A | 7/2000 | Runesson et al. | |

FOREIGN PATENT DOCUMENTS

| | | |
|---|---|---|
| DE | 24 57 938 C2 | 6/1976 |
| DE | 31 51 070 A1 | 8/1983 |
| DE | 41 01 567 A1 | 7/1992 |
| DE | 42 16 573 C2 | 11/1993 |
| DE | 195 35 711 C1 | 1/1997 |
| DE | 100 56 276 A1 | 5/2002 |
| DE | 102 02 415 C1 | 4/2003 |

*Primary Examiner*—F. Daniel Lopez
(74) *Attorney, Agent, or Firm*—Cohen, Pontani, Lieberman & Pavane

(57) ABSTRACT

An adjusting device includes a piston cylinder unit with a cylinder having a piston and a piston rod movably arranged therein, the piston rod extending out of the cylinder. A piston rod guide includes a support element having a first part arranged in the cylinder and bearing axially against one part of the cylinder and a second part connected to the first part. An annular seal arranged between the second part of the support element and the interior of the cylinder such that pressure in the cylinder acts on the seal which bears on the second part of the support element. The connection between the first and second parts of the support element is releasable when the force of the annular seal bearing on the support element exceeds a bearing force limit. The first and second parts of the support elements move telescopically from a normal position to an overload position when the connection is released and reduce the axial length of the support element. A stop supported on the first part protrudes through said second part and is proximate the annular seal in the normal position.

35 Claims, 8 Drawing Sheets

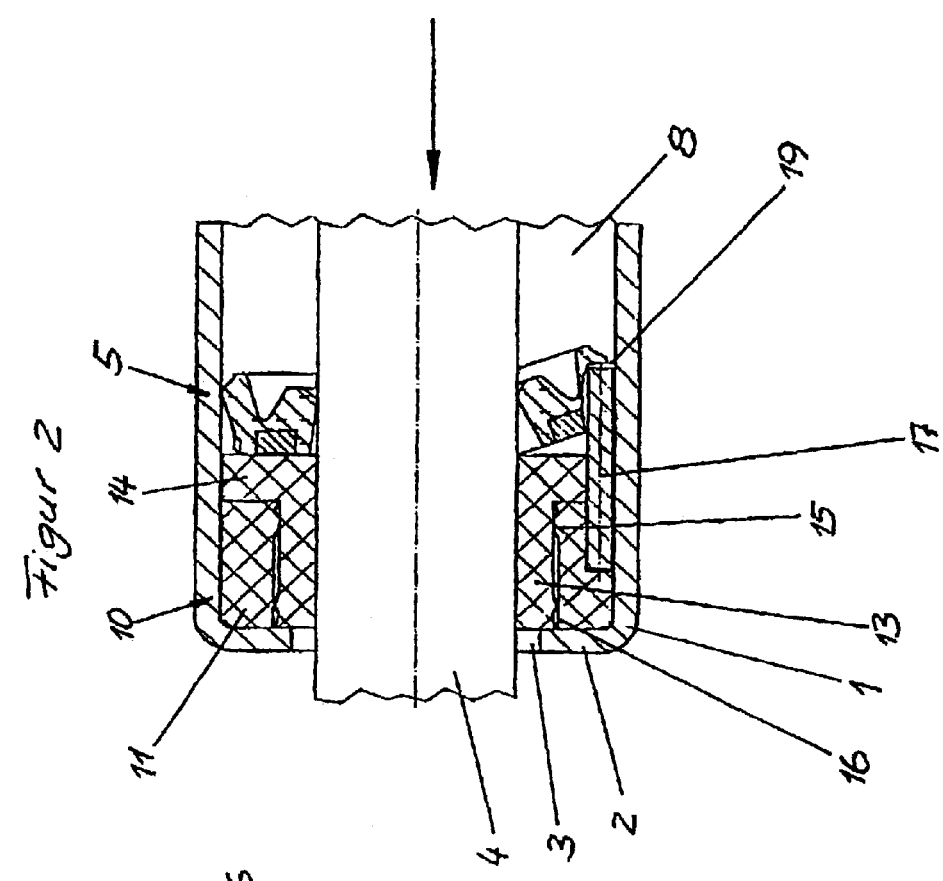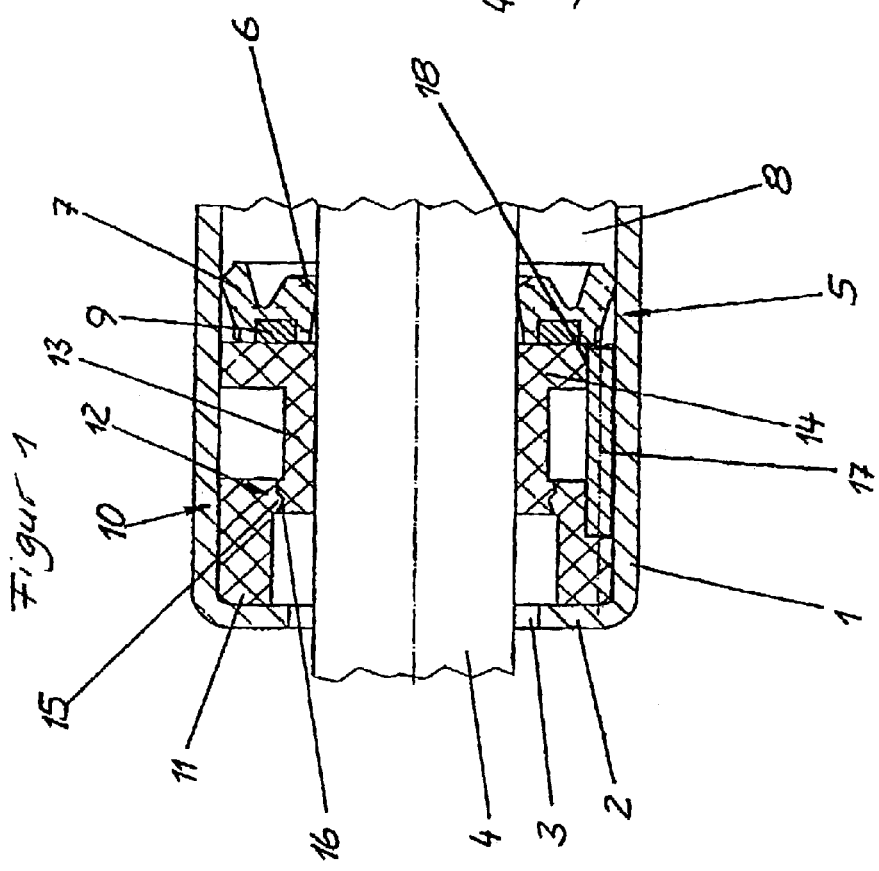

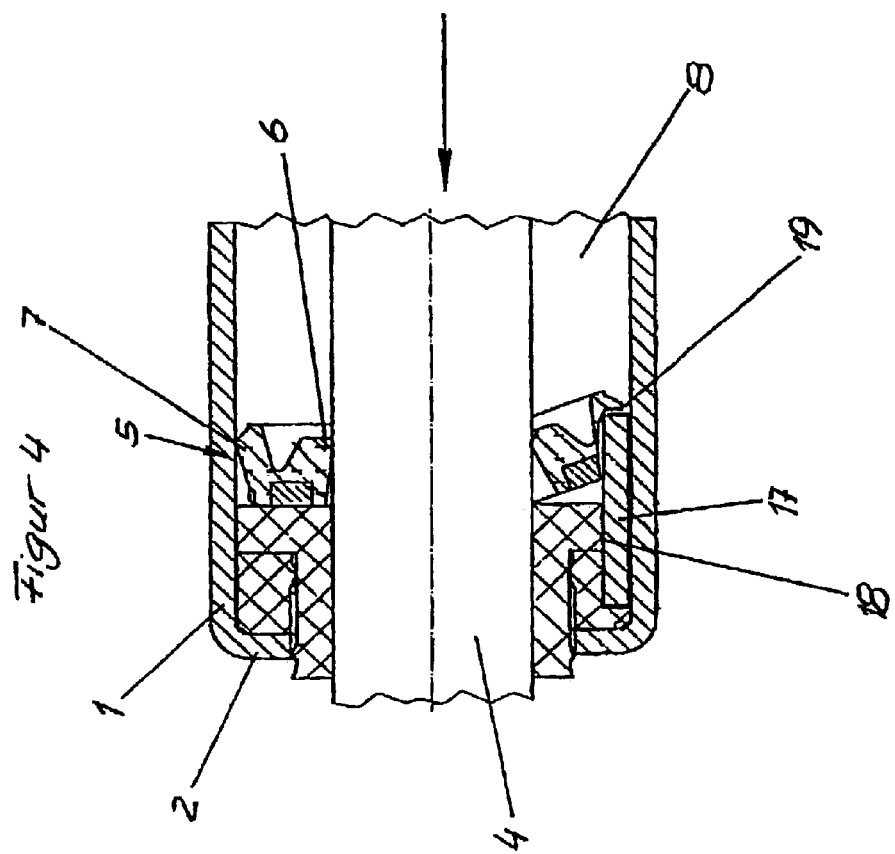
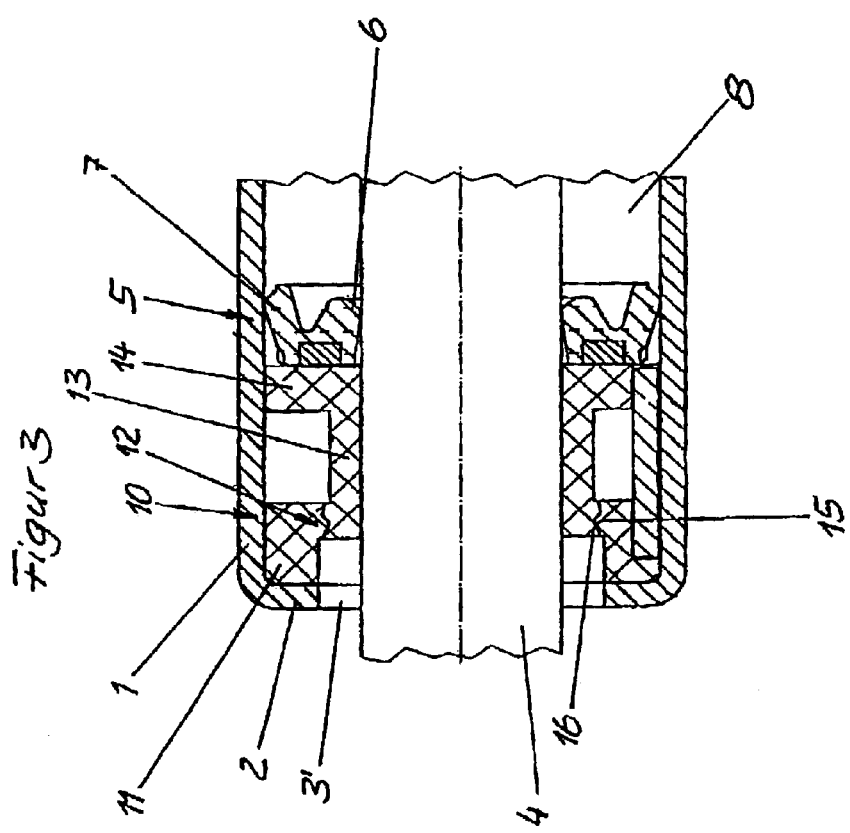

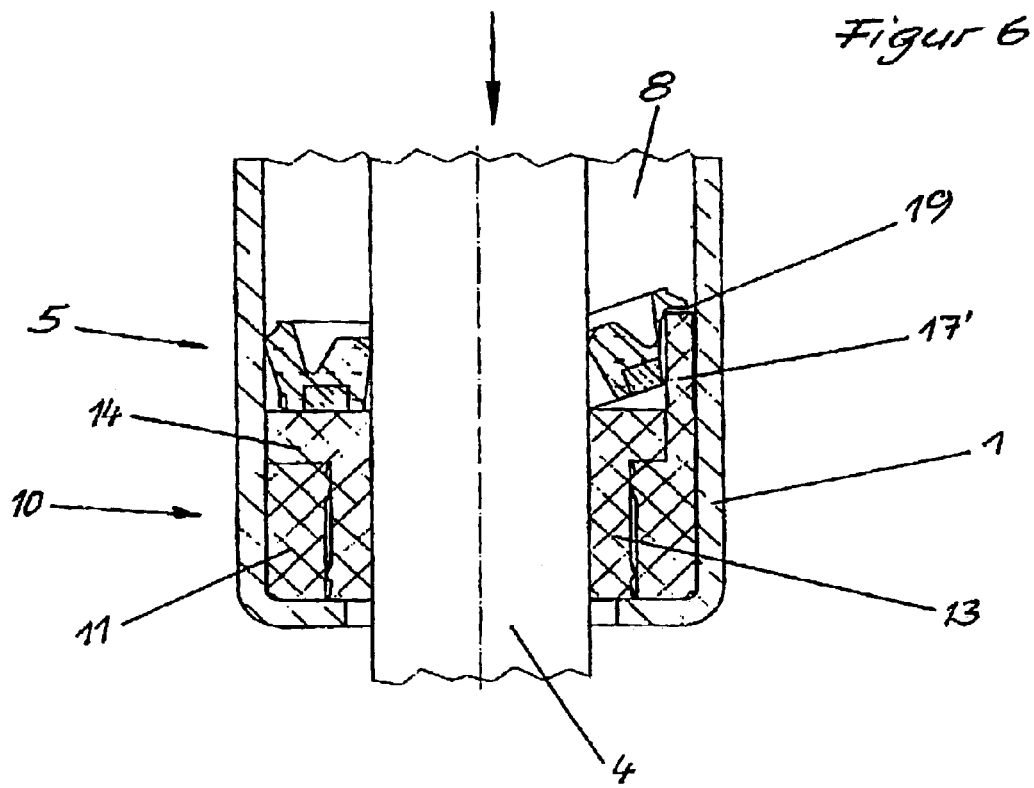
Figur 6
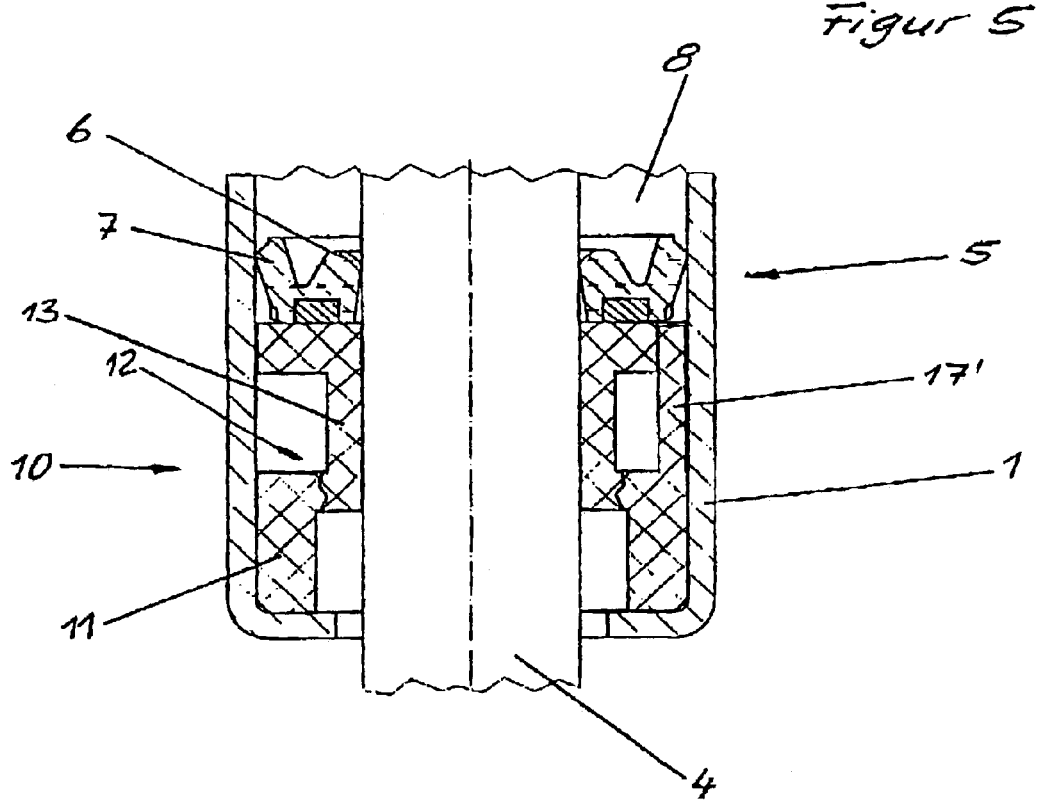
Figur 5

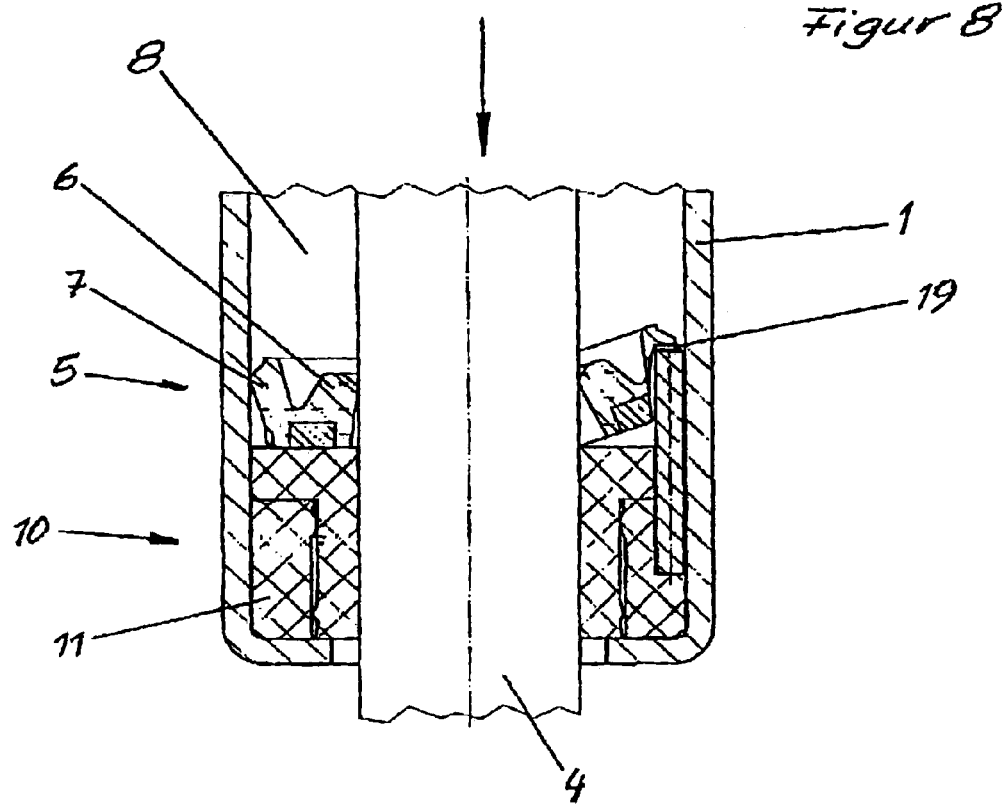
Figur 8
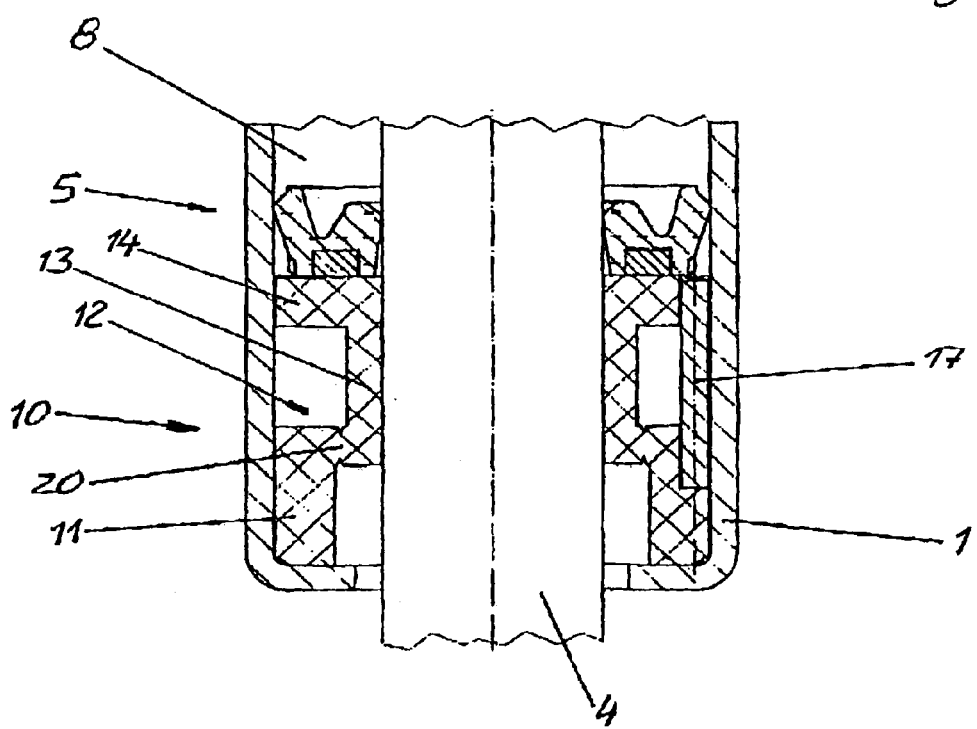
Figur 7

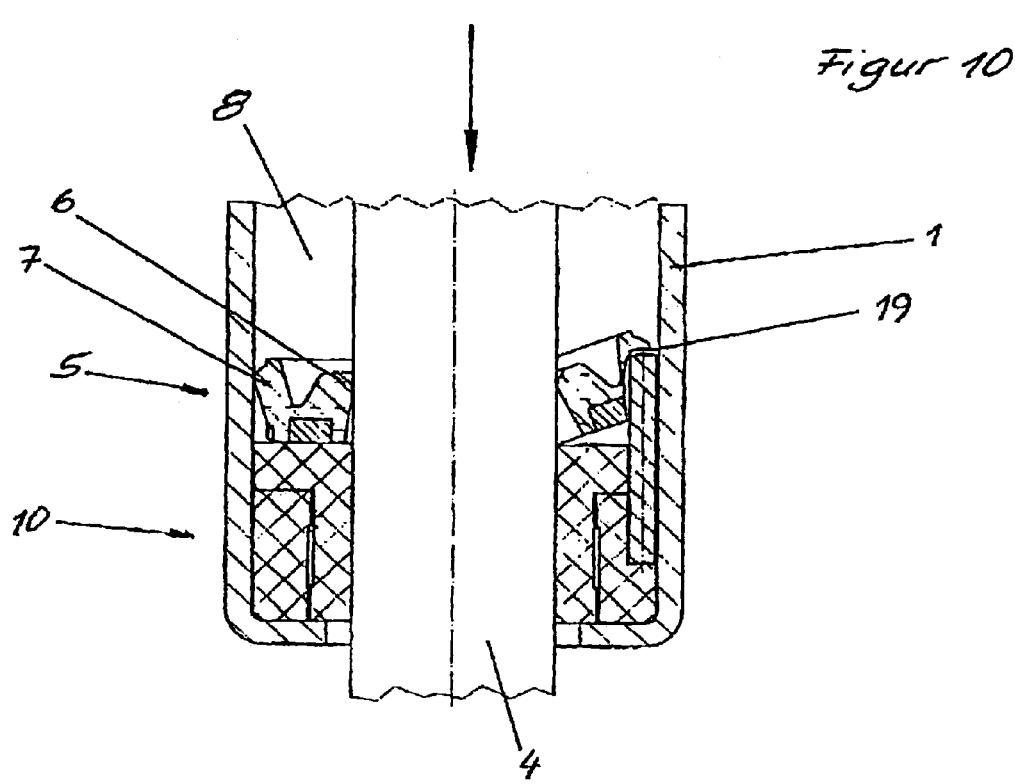
Figur 10
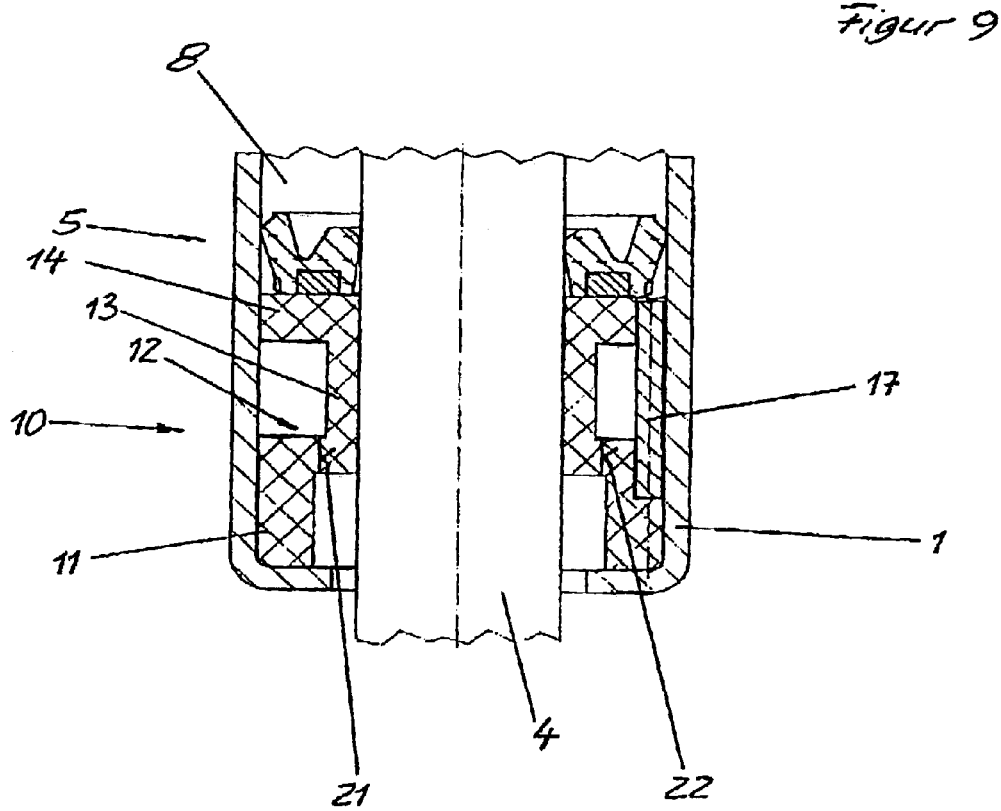
Figur 9

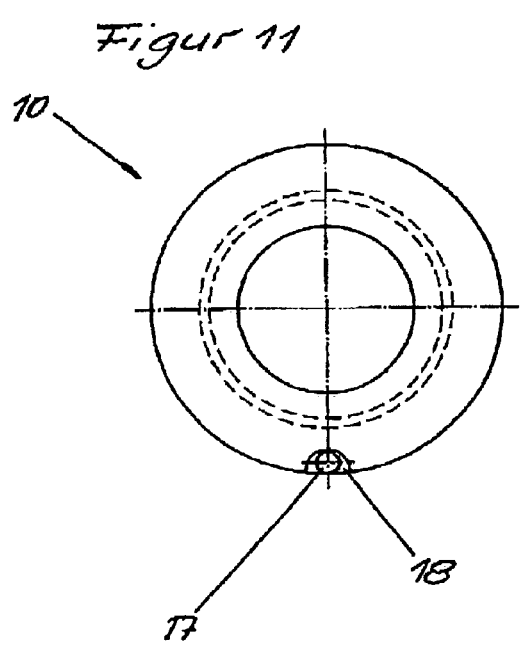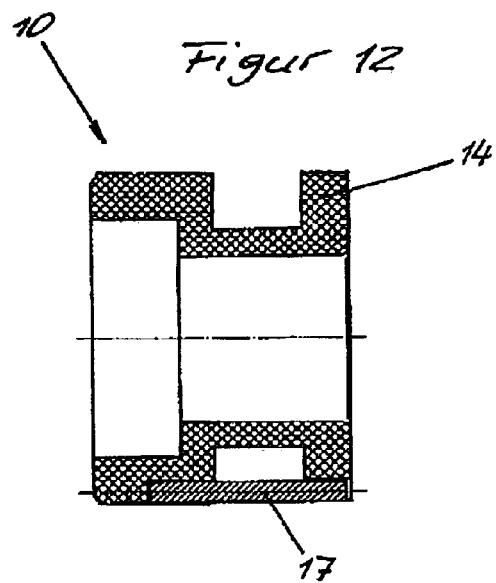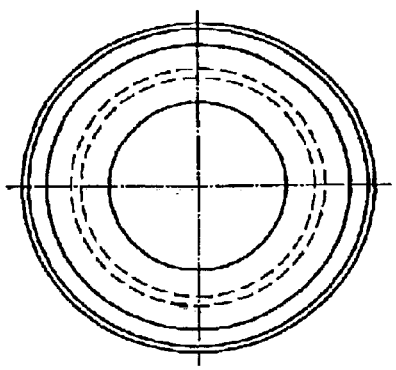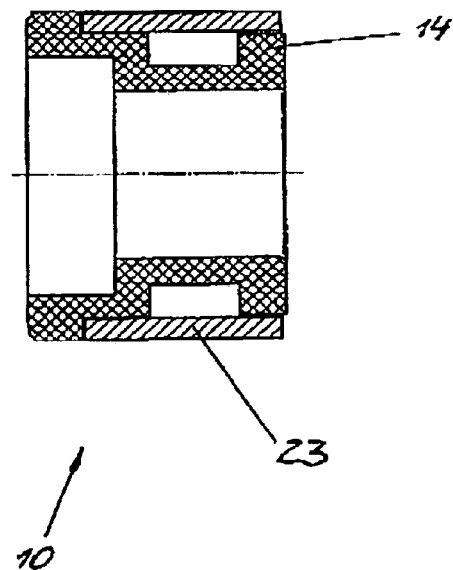

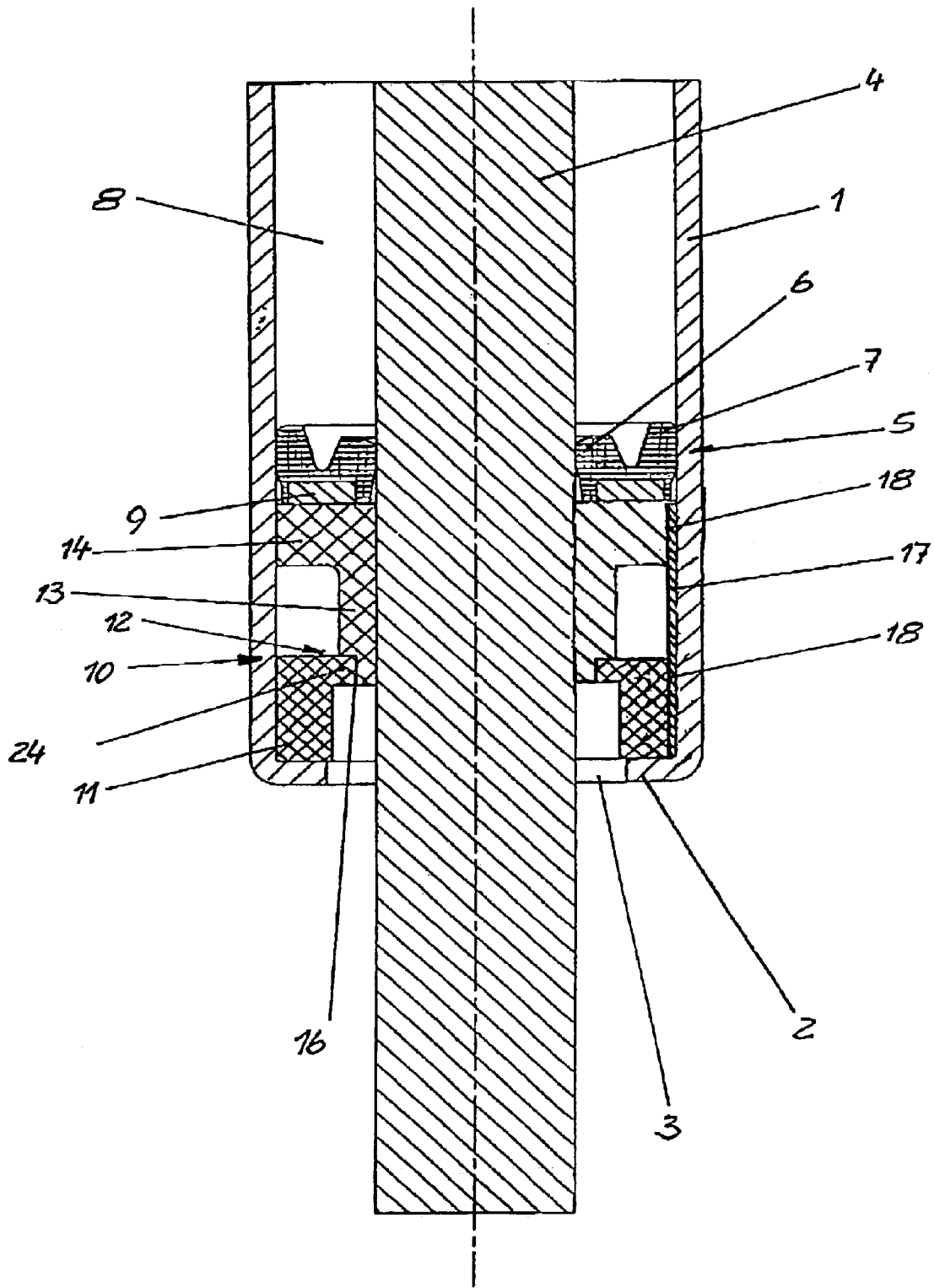
Figur 15

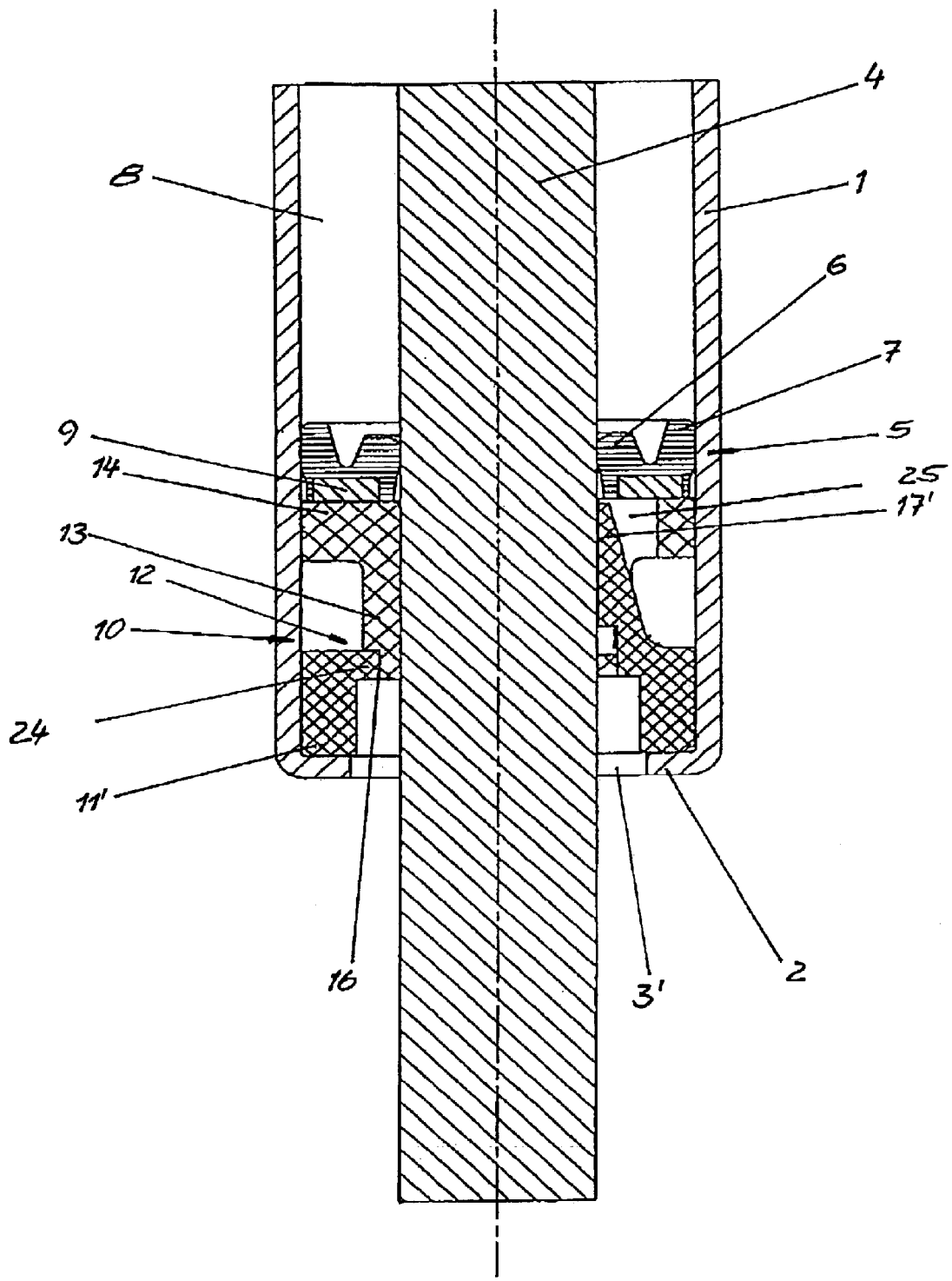
Figur 16

ADJUSTING ELEMENT HAVING A CYLINDER

BACKGROUND OF THE INVENTION

1. Field of the Invention

The invention relates to an adjusting element having a cylinder, the interior space of which contains a pressurized medium, having a piston which is arranged displaceably in the cylinder and has a piston rod which protrudes out of the cylinder at one end of the cylinder, having an annular seal which surrounds the piston rod and, with its inner, radially encircling circumference, bears in a sealing manner against the piston rod and, with its outer, radially encircling circumference, bears in a sealing manner against the inner wall of the cylinder, is acted upon, on its side facing the interior space, by the pressure of the medium and, with its side facing away from the interior space, is supported on a supporting element, which, in turn, with its end facing away from the annular seal, is supported on part of the cylinder, it being possible for the supporting element, when a certain bearing force of the annular seal against the supporting element is exceeded, to be deformed somewhat telescopically, reducing its axial length in the cylinder, from a normal position into an overload position, as a result of which a passage opening from the interior space of the cylinder to the surroundings can be produced.

2. Description of the Prior Art

In the case of adjusting elements of this type, which are preferably gas-filled springs, the interior space, which is filled with the medium, can be connected to the surroundings when a certain internal pressure of the cylinder is exceeded, in order to avoid excessive internal pressure in the cylinder. An excessive internal pressure, which can arise due to an increase in temperature, for example in the event of burning in the vicinity of the adjusting element, or else also due to deformation, may result in the cylinder being destroyed or in the piston rod being pushed out of the cylinder.

Gas-filled springs of this type may, for example, be pneumatic adjusting elements for ease of operation of the trunk lid or the engine hood of a motor vehicle, said adjusting elements forming a weight counterbalance to the parts which have been adjusted.

An adjusting element of the type mentioned at the beginning is disclosed in DE 41 01 567. When the defined bearing force of the annular seal against the supporting element is exceeded, the annular seal is displaced toward the opening from which the piston rod emerges from the cylinder and thus opens up a hole in the cylinder, via which the interior space of the cylinder is connected to the surrounds thus enabling the medium contained in the cylinder to escape into the surroundings. In this case, it is disadvantageous that moisture can enter into the cylinder through the hole, which results in corrosion.

A further known adjusting element (DE 24 57 938 C2) has a predetermined breaking point which breaks when overstressed thus enabling the gas contained in the interior space of the cylinder to escape to the outside. This predetermined breaking point can be formed on the cylinder wall or on the piston rod, which is provided with an outwardly closed coaxial hole. When a certain bursting pressure of the cylinder is exceeded, the parts separated at the predetermined breaking point can fly around and cause damage.

DE 195 35 711 C1 discloses an adjusting element which has, for the piston, a stop which is designed as a sleeve and which limits the outward movement of the piston and piston rod. The sleeve consists of a material which can melt above a defined temperature. If the temperature increases beyond the defined temperature, then the sleeve melts and the piston can be displaced further outward. In the process, a bypass to the outside is provided, the bypass circumventing the annular seal and enabling the gas contained in the cylinder to escape. This bypass is formed by a cross-sectional tapering of the piston rod, but results in the piston rod being weakened.

SUMMARY OF THE INVENTION

The object of the invention is to provide an adjusting element of the type mentioned at the beginning which avoids these disadvantages and, if the pressure in the interior space of the cylinder increases beyond a defined internal pressure, results in reliable pressure relief of the interior space, and is constructed with just a few simple components.

This object is achieved according to the invention in that the supporting element has a first part which is arranged in the cylinder and a second part which is connected to the first part, can be moved from the normal position toward the first part into the overload position and against which the annular seal bears, it being possible for one end of a stop to be supported on the first part, said stop, in the normal position, protruding through the second part axially in order to extend the cylinder at least until close to the annular seal.

This object is likewise achieved in that the supporting element has a first part which is arranged in the cylinder and a second part which is connected to the first part, can be moved from the normal position toward the first part into the overload position and against which the annular seal bears, the first tube section, which forms the first part being supported axially on an end wall of the cylinder, said end wall having a passage opening through which the piston rod protrudes out of the cylinder, and it being possible for one end of a stop to be supported on the end wall, said stop, in the normal position, protruding through the second part axially in order to extend the cylinder at least until close to the annular seal.

The passage opening leading from the interior space of the cylinder to the surroundings is opened only as a function of the internal pressure in the cylinder, irrespective of how this excessive internal pressure came about. This may be caused by overheating in the event of burning or by mechanical deformation of the cylinder.

The displacement of the moveable part of the supporting element and thus reduction in the axial length of the supporting element causes the annular seal to be acted upon at at least one point by the stop in such a manner that the annular seal is at least lifted off from the inner wall of the cylinder or from the piston rod or the annular seal is even damaged. This creates a passage opening from the interior space of the cylinder to a region connected to the surroundings, said passage opening permitting the pressurized medium, in particular a gas, to flow out of the interior space of the cylinder into the surroundings and thus reducing the pressure in the cylinder.

Weakening of the cylinder wall or piston rod and large openings leading outward are avoided.

The first and second parts can be connected to each other in a simple manner in the normal position by a frictional connection or by a form-fitting connection which can be released by exceeding the defined bearing force of the annular seal.

A further possibility, which is likewise of simple construction and has few components, is for the first and second parts to be connected to each other in the normal position via a predetermined breaking point which can be broken open by exceeding the defined bearing force of the annular seal.

If the annular seal has an inner sealing lip bearing against the piston rod and/or an outer sealing lip bearing against the inner wall of the cylinder, in which case the stop extends axially toward the inner and/or outer sealing lip, then the annular seal is acted upon at an easily deformable or destructible point by the stop, with the result that a rapid reduction in pressure occurs when the defined internal pressure in the cylinder is exceeded.

In order for the sealing lips to flex and for the base of the annular seal to be dimensionally stable, the annular seat can have a stabilizing ring made of a material which is less flexible than the material of the annular seal past which the stop can be moved radially on the inside and/or radially on the outside.

The stop can be a pin-like ram which acts upon the annular seal at one point.

If the stop is a sleeve annularly surrounding the piston rod, then the annular seal is acted upon over its entire circumference, this resulting in an immediate, large passage opening and hence in a particularly rapid reduction in pressure.

The stop is preferably fixed on the first part.

In order to reduce the components further and to reduce the outlay on installation even further, the stop can be formed integrally with the first part.

A simply designed construction which has few components and can easily be fitted is brought about if the first and/or the second part form tube sections which, in the normal position, are arranged at least largely axially one behind the other and are connected to each other at their mutually facing end regions, it being possible for this connection to be released when the defined bearing force of the annular seal is exceeded and for the tube sections to be pushed telescopically into each other.

If the supporting element bears with at least part of its radially encircling, outer circumferential surface against the inner wall of the cylinder and with at least part of its radially encircling, inner circumferential surface against the piston rod and forms a piston rod guide, then the supporting element carries out a dual function.

In order to form wide supporting surfaces for the annular seal and/or for the axial support, the first and/or the second part of the supporting element can have, at its end facing away from the other part in each case, a radially expanding and/or radially decreasing collar.

In order to support the supporting element axially, the first tube section forming the first part can be supported axially on an end wall of the cylinder, said end wall having a passage opening through which the piston rod protrudes out of the cylinder. If the first tube section forming the first part is the outer part and the second tube section forming the second part is the inner part of the telescope, with the outside diameter of the second tube section being smaller than the diameter of the passage opening, then when the second part is retracted telescopically into the first part, the second part can protrude with its one end region outward through the passage opening. This permits an axially short design of the first part and therefore also an axially shorter design of the adjusting element.

BRIEF DESCRIPTION OF THE DRAWINGS

Exemplary embodiments of the invention are illustrated in the drawings and will be described in greater detail below.

In the drawings wherein like reference characters denote similar elements throughout the several views:

FIG. 1 is a sectional side view of a first exemplary embodiment of an adjusting element in the normal position;

FIG. 2 is a sectional side view of the adjusting element according to FIG. 1 in the over load position;

FIG. 3 is a sectional side view of a second exemplary embodiment of an adjusting element in the normal position;

FIG. 4 is a sectional side view of the adjusting element according to FIG. 3 in the over load position;

FIG. 5 is a sectional side view of a third exemplary embodiment of an adjusting element in the normal position;

FIG. 6 is a sectional side view of the adjusting element according to FIG. 5 in the over load position;

FIG. 7 is a sectional side view of a fourth exemplary embodiment of an adjusting element in the normal position;

FIG. 8 is a sectional side view of the adjusting element according to FIG. 7 in the over load position;

FIG. 9 is a sectional side view of a fifth exemplary embodiment of an adjusting element in the normal position;

FIG. 10 is a sectional side view of the adjusting element according to FIG. 9 in the over load position;

FIG. 11 is an end view of the supporting element of the adjusting element according to FIG. 1;

FIG. 12 is a side view of the supporting element of the adjusting element according to FIG. 1;

FIG. 13 is an end view of a sixth exemplary embodiment of the adjusting element;

FIG. 14 is a sectional side view of the supporting element of the adjusting element according to FIG. 13;

FIG. 15 is a sectional side view of a seventh exemplary embodiment of an adjusting element in the normal position;

FIG. 16 is a sectional side view of a eighth exemplary embodiment of an adjusting element in the normal position.

DETAILED DESCRIPTION OF THE PREFERRED EMBODIMENTS

The adjusting element illustrated in the figures has a tubular cylinder 1, the wall of which is crimped at the one end of the cylinder 1 to form an end wall 2. A continuous passage opening 3, 3' is formed in the end wall 2 coaxially with the longitudinal extent of the cylinder 1.

Arranged displaceably in the cylinder 1 is a piston (not illustrated) which has a piston rod 4 which protrudes outward through the passage opening 3, 3'.

The piston rod 4 is surrounded by an annular seal 5 which, with its radially encircling, inner sealing lip 6, bears against the piston rod 4 and, with its radially encircling, outer sealing lip 7, bears against the inner wall of the cylinder 1. The sealing lips 6 and 7 are arranged on that side of the annular seal 5 which faces the interior space 8 of the cylinder 1 and are acted upon, pressing them against the piston rod 4 and the inner wall of the cylinder 1, respectively, by a pressurized gas situated in the interior space 8.

In order to stabilize the annular seal 5, the latter has, on its side facing away from the interior space 8, an inserted ring 9 made of a material which is less flexible than the material of the annular seal 5.

The annular seal 5, which is acted upon by the gas pressure, is supported, by means of its annular surface which faces away from the interior space 8, on a supporting element 10. This supporting element 10 comprises a first part 11, 11' which is designed as a tube section and, with its radially encircling, outer circumferential surface, bears against the inner wall of the cylinder 1 and, with its end surface facing the end wall 2, is supported on the end wall 2.

At its end region which faces away from the end wall 2, the first part 11, 11' is connected radially inward via a connection 12, which can be released under the action of force, to an end region of a second part 13 of the supporting element 10, which part is likewise designed as a tube section, with the outside diameter of the tube section of the second part 13 being somewhat smaller than the inside diameter of the tube section of the first part 11, 11'. The inner, radially encircling circumferential surface of the second part 13 surrounds the piston rod 4 and forms a guide bushing of the piston rod 4.

At its other end which protrudes toward the interior space 8, the second part 13 is constructed with a radially expanding collar 14, the radially outer, encircling circumferential surface of which bears against the inner wall of the cylinder 1 and is guided displaceably. The second part 13 thus forms an axial guide of the piston rod 4 in the cylinder 1.

The annular seal 5 is supported on that annular surface of the collar 14 which is directed toward the interior space 8.

The connection 12 comprises a radially encircling annular bead 15, which protrudes inward from the inner circumferential surface of the first part 11, or an annular projection 24 which, in the normal position illustrated in FIGS. 1, 3, 15 and 16, protrudes into a corresponding, radially encircling annular groove 16 on the outer circumferential surface of the tube section of the second part 13 and forms a latching connection with said annular groove.

This latching connection is configured in such a manner that, when a defined bearing force is exceeded, the annular seal 5, which is acted upon by the gas pressure pressing it against the second part 13, is disengaged from the second part 13, with the result that, as illustrated in FIGS. 2 and 4, the tubular section of the second part 13 is displaced telescopically from the normal position into the interior of the first part 11, 11' into an overload position until the collar 14 comes to bear against the first part 11, 11'.

A pin-like ram 17, which is arranged fixedly with its one end on the first part 11 and extends axially towards the annular seal 5, protrudes, in the normal position illustrated in FIGS. 1 and 3, through an axially continuous recess 18 in the collar 14 until close to the annular seal 5, in the region of its outer sealing lip 7.

In FIG. 15, a pin-like ram 17 is arranged in an axially continuous recess 18 on the radially outer circumferential region of the first part 11 and of the second part 13, said ram extending axially toward the annular seal 5 and, in the normal position illustrated, protruding until close to the annular seal 5, in the region of its outer sealing lip 7. At its other end, the ram 17 is supported on the wall 2.

The telescopic displacement of the second part 13 into the first part 11, 11' causes the annular seal 5 to be acted upon in the region of its outer sealing lip 7 by the ram 17 in such a manner that, in the region of the ram 17, the sealing lip 7 is lifted off from the collar 14 from the inner wall of the cylinder 1, and a passage opening 19 from the interior space 8 to that side of the annular seal which faces away from the interior space 8 is produced.

In the overload position, the gas can now escape from the interior space 8 via this passage opening 19 and the gaps between the piston rod 4 and the first part 11 and between the first part 11, 11' and the second part 13, to the passage opening 3, 3' and from there into the surroundings. The gas pressure in the interior space 8 is thus reduced.

By defining the latching force of the connection 12 in different ways, it can be established at what gas pressure in the interior space 8 and hence at what bearing force of the annular seal 5 against the supporting element 10 is a bypass-type connection of the interior space 8 to the surroundings to take place.

The exemplary embodiment of FIGS. 3 and 4 corresponds substantially to the exemplary embodiment of FIGS. 1 and 2. The diameter of the passage opening 3' differs. Said diameter is larger than the outside diameter of the tube section of the second part 13, with the result that the latter can protrude outward through the passage opening 3' in the overload position. This enables the first part 11, and thus also the cylinder 1, to be formed with a smaller length.

The exemplary embodiment, which is illustrated in FIGS. 5 and 6, of an adjusting element corresponds to a very substantial extent to the exemplary embodiment illustrated in FIGS. 1 and 2. The sole difference is that the pin-like ram 17', which forms a stop, is formed integrally with the first part 11'.

The exemplary embodiment of FIGS. 7 and 8 also corresponds to a very substantial extent to the exemplary embodiment illustrated in FIGS. 1 and 2. In contrast thereto, the connection 12 comprises a predetermined breaking point 20 which, by a defined bearing force of the annular seal 5, which is acted upon by the gas pressure pushing it against the second part 13, being exceeded breaks open, so that the tube section of the second part 13 is displaced telescopically into the interior of the first part 11 (FIG. 8).

In FIGS. 9 and 10, the connection 12 is a frictional connection, in which the inner circumferential surface of the first part 11 has a radially encircling annular surface 21 which frictionally surrounds a corresponding, radially encircling annular surface 22 on the outer circumferential surface of the tube section of the second part 13. When a defined bearing force of the annular seal 5, which is acted upon by the gas pressure pressing it against the second part 13, is exceeded, the bypass-type connection between the annular surfaces 21 and 22 is overcome and the tube section of the second part 13 is displaced telescopically into the interior of the first part 11 (FIG. 10).

FIGS. 13 and 14 show a design of the stop as an alternative to the ram 17 illustrated in FIGS. 11 and 12. In this case, an annular sleeve 23 forms the stop. The sleeve 23 is arranged fixedly with its one end on the first part 11 and extends, surrounding the second part 13 with a clearance, axially toward the annular surface 5 until close to the annular seal 5, in the region of the outer sealing lip 7.

The telescopic displacement of the second part 13 into the first part 11 enables the annular seal 5 to be acted upon in the region of its outer sealing lip 7 by the sleeve 23 in such a manner that the feeling lip 7 lifts off along its entire, radialy encircling length, from the collar 14 and from the inner wall of the cylinder 1 and immediately produces a large passage opening from the interior space of the cylinder to that side of the annular seal which faces away from the interior space.

The exemplary embodiment of FIG. 16 corresponds substantially to the exemplary embodiment of FIG. 15. In contrast to FIG. 15, the ram 17' is formed. integrally with the first part 11' and is thus supported with the first part 11' on the end wall 2. It protrudes through an axial recess 25 in the second part 13 in a spike-like manner axially toward the annular seal 5 where it protrudes, in the normal position illustrated, with its free end until close to the annular seal 5, in the region of its inner sealing lip 6.

The telescopic displacement is the second part 13' into the first part 11' enables the annular seal 5 to be acted upon radially within the ring 9, in the region of its inner sealing lip 6, by the ram 17' in such a manner that, in the region of the ram 17', the sealing lip 6 lifts off from the collar 14 and from the inner wall of the cylinder 1 and, as in FIG. 15, a passage opening from the interior space 8 to that side of the annular seal 5 which faces away from the interior space 8 and to the surroundings is produced.

What is claimed is:

1. An adjusting element, comprising:
   a cylinder having two ends and an inner wall defining an interior space containing a pressurized medium;
   a piston rod axially displaceably arranged in said cylinder and connectable to a piston, said piston rod extending through one of the two ends of said cylinder;
   an annular seal surrounding said piston rod having an inner radially encircling circumference sealingly bearing against said piston rod and an outer radially encircling circumference sealingly bearing against the inner wall of said cylinder, said annular seal having a side facing the interior space acted upon by a pressure of said pressurized medium; and
   a supporting element, wherein a side of said annular seal facing away from said interior space is supported on said supporting element, an end of said supporting element facing away from said annular seal being supported on a part of said cylinder, wherein said supporting element is telescopically deformable from a normal position to an overload position to reduce an axial length of said supporting element when a bearing force of said annular seal against said supporting element exceeds a bearing force limit, a passage between said interior space of said cylinder and ambient surroundings of said cylinder being opened in said overload position,
   said supporting element having a first part arranged in said cylinder and a second part connected to said first part in the normal position and movable toward said first part to the overload position, said annular seal bearing on said second part, said support element having a stop with a first end supported on said first part and a second end protruding axially through said second part to a position proximate said annular seal.

2. The adjusting element of claim 1, wherein said first and second parts of said support element are connected to each other by a frictional connection in the normal position, said frictional connection being releasable when the bearing force of said annular seal against said supporting element exceeds the bearing force limit.

3. The adjusting element of claim 1, wherein said first and second parts of said support element are connected to each other by a form-fitting connection in the normal position, said form-fitting connection being releasable when the bearing force of said annular seal against said supporting element exceeds the bearing force limit.

4. The adjusting element of claim 1, wherein said first and second parts of said support element are connected to each other at a breaking point in the normal position, said connection being releasable such that said breaking point breaks when the bearing force of said annular seal against said supporting element exceeds the bearing force limit.

5. The adjusting element of claim 1, wherein said annular seal comprises one of an inner sealing lip bearing against said piston rod and an outer sealing lip bearing against said inner wall of said cylinder, wherein said stop extends toward said one of said inner sealing lip and said outer sealing lip.

6. The adjusting element of claim 1, wherein said annular seal is made of a first material and further comprises a stabilizing ring made of a second material that is less flexible than said first material, said stabilizing ring being arranged such that said stop is extendable past said stabilizing ring on one of a radially inner and a radially outer side of said stabilizing ring when said support ring moves from the normal position to the overload position.

7. The adjusting element of claim 6, wherein said stop comprises a pin-shaped ram made of steel.

8. The adjusting element of claim 6, wherein said stop comprises an annular sleeve surrounding said piston rod.

9. The adjusting element of claim 1, wherein said stop comprises a pin-shaped ram made of steel.

10. The adjusting element of claim 1, wherein said stop comprises an annular sleeve surrounding said piston rod.

11. The adjusting ring of claim 1, wherein said stop is fixedly connected with said first part of said support element.

12. The adjusting element of claim 1, wherein said stop is formed as an integral piece with said first part of said support element.

13. The adjusting element of claim 1, wherein said first and second part comprise first and second tube sections, said first and second tube section arranged axially one behind the other and are connected by a connection at mutually facing end regions in the normal position, said connection being releasable when a bearing force of said annular seal against said supporting element exceeds a bearing force limit, said first and second tube sections being pushed telescopically into one another when said support element moves to said overload position.

14. The adjusting element of claim 13, wherein said supporting element comprises a piston rod guide having an inner circumferential surface bearing against said piston rod and an outer circumferential surface bearing against said inner wall.

15. The adjusting element of claim 14, wherein at least one of the first and second parts of the support element comprises one of a radially decreasing and a radially expanding collar on an end facing away from the other one of the first and second parts.

16. The adjusting element of claim 13, wherein the first part is axially supported on an end wall of said cylinder, said end wall of said cylinder defining an opening through which said piston rod extends.

17. The adjusting element of claim 13, wherein at least one of the first and second parts of the support element comprises one of a radially decreasing and a radially expanding collar on an end facing away from the other one of the first and second parts.

18. The adjusting element of claim 16, wherein said first tube section comprises an outer telescopic section and said second tube section comprises an inner telescopic section, wherein an outer diameter of said second tube section is smaller than the diameter of said opening through which said piston rod extends.

19. An adjusting element, comprising:
   a cylinder having two ends and an inner wall defining an interior space containing a pressurized medium;
   a piston rod axially displaceably arranged in said cylinder and connectable to a piston, said piston rod extending through one of the two ends of said cylinder;
   an annular seal surrounding said piston rod having an inner radially encircling circumference sealingly bearing against said piston rod and an outer radially encircling circumference sealingly bearing against the inner wall of said cylinder, said annular seal having a side facing the interior space acted upon by a pressure of said pressurized medium; and a supporting element, wherein a side of said annular seal facing away from said interior space is supported on said supporting element, an end of said supporting element facing away from said annular seal being supported on a part of said cylinder, wherein said supporting element is telescopically deformable from a normal position to an overload position to reduce an axial length of said supporting element when a bearing force of said annular seal against said supporting element exceeds a bearing force limit, a passage between said interior space of said cylinder and ambient surroundings of said cylinder being opened in said overload position, said supporting element having a first part supported axially on an end wall of said cylinder and a second part connected to said first part in the normal position and movable toward said first part to the overload position, said annular seal bearing on said second part, said end wall of said cylinder defining an opening through which said piston rod extends, said support element having a stop with a first end supported on said end wall of said cylinder and a second end protruding axially through said second part to a position proximate said annular seal.

20. The adjusting element of claim 19, wherein said first and second parts of said support element are connected to each other by a frictional connection in the normal position, said frictional connection being releasable when the bearing force of said annular seal against said supporting element exceeds the bearing force limit.

21. The adjusting element of claim 19, wherein said first and second parts of said support element are connected to each other by a form-fitting connection in the normal position, said form-fitting connection being releasable when the bearing force of said annular seal against said supporting element exceeds the bearing force limit.

22. The adjusting element of claim 19, wherein said first and second parts of said support element are connected to each other at a breaking point in the normal position, said connection being releasable such that said breaking point breaks when the bearing force of said annular seal against said supporting element exceeds the bearing force limit.

23. The adjusting element of claim 19, wherein said annular seal comprises one of an inner sealing lip bearing against said piston rod and an outer sealing lip bearing against said inner wall of said cylinder, wherein said stop extends toward said one of said inner sealing lip and said outer sealing lip.

24. The adjusting element of claim 19, wherein said annular seal is made of a first material and further comprises a stabilizing ring made of a second material that is less flexible than said first material, said stabilizing ring being arranged such that said stop is extendable past said stabilizing ring on one of a radially inner and a radially outer side of said stabilizing ring when said support ring moves from the normal position to the overload position.

25. The adjusting element of claim 24, wherein said stop comprises a pin-shaped ram made of steel.

26. The adjusting element of claim 24, wherein said stop comprises an annular sleeve surrounding said piston rod.

27. The adjusting element of claim 19, wherein said stop comprises a pin-shaped ram made of steel.

28. The adjusting element of claim 19, wherein said stop comprises an annular sleeve surrounding said piston rod.

29. The adjusting ring of claim 19, wherein said stop is fixedly connected with said first part of said support element.

30. The adjusting element of claim 19, wherein said stop is formed as an integral piece with said first part of said support element.

31. The adjusting element of claim 19, wherein said first and second part comprise first and second tube sections, said first and second tube section arranged axially one behind the other and are connected by a connection at mutually facing end regions in the normal position, said connection being releasable when a bearing force of said annular seal against said supporting element exceeds a bearing force limit, said first and second tube sections being pushed telescopically into one another when said support element moves to said overload position.

32. The adjusting element of claim 31, wherein said supporting element comprises a piston rod guide having an inner circumferential surface bearing against said piston rod and an outer circumferential surface bearing against said inner wall.

33. The adjusting element of claim 32, wherein at least one of the first and second parts of the support element comprises one of a radially decreasing and a radially expanding collar on an end facing away from the other one of the first and second parts.

34. The adjusting element of claim 31, wherein at least one of the first and second parts of the support element comprises one of a radially decreasing and a radially expanding collar on an end facing away from the other one of the first and second parts.

35. The adjusting element of claim 31, wherein said first tube section comprises an out telescopic section and said second tube section comprises an inner telescopic section, wherein an outer diameter of said second tube section is smaller than the diameter of said opening through which said piston rod extends.

* * * * *